June 21, 1966 M. E. KLINE, JR 3,256,901

AUTOMATIC CHEMICAL INJECTION CONTROL

Filed Oct. 23, 1961 4 Sheets-Sheet 1

INVENTOR.
M. E. KLINE, JR.

BY *Judson & Yancy*

ATTORNEYS

INVENTOR.
M. E. KLINE, JR.

June 21, 1966    M. E. KLINE, JR    3,256,901
AUTOMATIC CHEMICAL INJECTION CONTROL
Filed Oct. 23, 1961    4 Sheets-Sheet 4

INVENTOR.
M.E. KLINE
BY *Hudson & Young*
ATTORNEYS

United States Patent Office 3,256,901
Patented June 21, 1966

3,256,901
AUTOMATIC CHEMICAL INJECTION CONTROL
Marvin E. Kline, Jr., Bartlesville, Okla., assignor to Phillips Petroleum Company, a corporation of Delaware
Filed Oct. 23, 1961, Ser. No. 146,984
2 Claims. (Cl. 137—93)

This invention relates to the continuous control of the rate of injection of a chemical treating agent into a treated fluid responsive to a measured property of the fluid representative of the treated condition. In one aspect this invention relates to a method and apparatus for controlling the BS & W content of an oil field produced fluid by continuously controlling the rate of injection of a chemical responsive to the BS & W content. In another aspect this invention relates to improved lease automatic custody transfer operations wherein the BS & W content of the transferred fluid is controlled by continuously controlling the rate of injection of a treating chemical automatically as a function of the BS & W content.

Crude oil commonly is treated to remove the BS & W by pumping the oil to a treating tank in which it is mixed with a treating chemical and further processed, if necessary, as by raising the temperature and filtering. In lease automatic custody transfer operation a BS & W monitor has been used to measure the BS & W content and, when the content is acceptable, the oil is pumped to a pipe line. If the BS & W content becomes too high, the oil is recycled to the treating tank for further treatment as noted above. This method often is inefficient. Since the object of the operation is to keep the BS & W content below a predetermined maximum at which the transfer operation will cease altogether there is a tendency to overtreat. That is, too much chemical is added, to be on the safe side, and the BS & W content of the oil often is much below the allowable value which, for example, may be 0.5 percent. When this occurs, the cost of the chemical treating agent is excessive. I have found that it is desirable to control the injection of the chemical continuously and to vary the rate of increase of injection more rapidly as the BS & W content approaches the allowable value.

An object of my invention is to continuously control the BS & W content of crude oil.

Another object of my invention is to provide economical treatment with normal BS & W content and at the same time prevent exceeding the BS & W allowable value by modifying the rate of increase of treatment with increase in BS & W content.

Another object of my invention is to provide improved oil field lease automatic custody transfer operation in which the BS & W content of the oil is continuously controlled.

Another object of my invention is to provide an improved signal amplification method and apparatus.

Other aspects, objects and the several advantages of my invention are apparent in the written description, the drawing and the claims.

According to my invention there are provided method and apparatus for controlling the BS & W content of an oil field produced fluid by measuring a property of the fluid which is representative of the BS & W content and automatically controlling continuously the rate of injection of a treating chemical in response thereto. A measurement representative of the BS & W content can be made by a capacitance-type BS & W probe. The output of the probe is fed to a monitor and then to a current amplifier. The amplified signal is applied to a transducer which produces a penumatic pressure proportional thereto. This pressure signal is used to actuate chemical injection means and thus vary the rate of injection as a function of the BS & W content. I have found that economical rates of treatment can be used at normal BS & W content, and the production of oil having BS & W content above an allowable value prevented by varying the rate of increase in treatment when the BS & W value exceeds a predetermined amount.

The combination of a monitor producing an electrical signal proportional to BS & W content, a magnetic amplifier, an electrical signal to pneumatic pressure transducer, and pneumatically actuated chemical injection means can be used to provide continuous control of BS & W content. By providing nonlinear negative feedback for the magnetic amplifier the rate of variation of treatment with BS & W content can be modified at higher BS & W values thus permitting economical treatment rates at normal BS & W content while preventing production of treated fluid having greater than an allowable maximum BS & W content. Preferably the nonlinear negative feedback is provided by utilizing parallel branches in the feedback circuit and providing means for connecting one of these branches when the BS & W content exceeds the predetermined value.

Also, according to my invention there is provided an improved electrical amplification system comprising a magnetic amplifier and a nonlinear negative system comprising parallel circuits, one of which is connected when the control signal, and thus the output, exceeds a predetermined value.

Further according to my invention a signal proportional to BS & W content is fed to a servo amplifier along with a reference signal and the output of the amplifier applied to vary the output of a chemical feed means as by varying the stroke length of an injector.

In the drawing, FIGURE 1 is a schematic diagram of a lease automatic custody transfer system including BS & W treating means.

Figure 1:
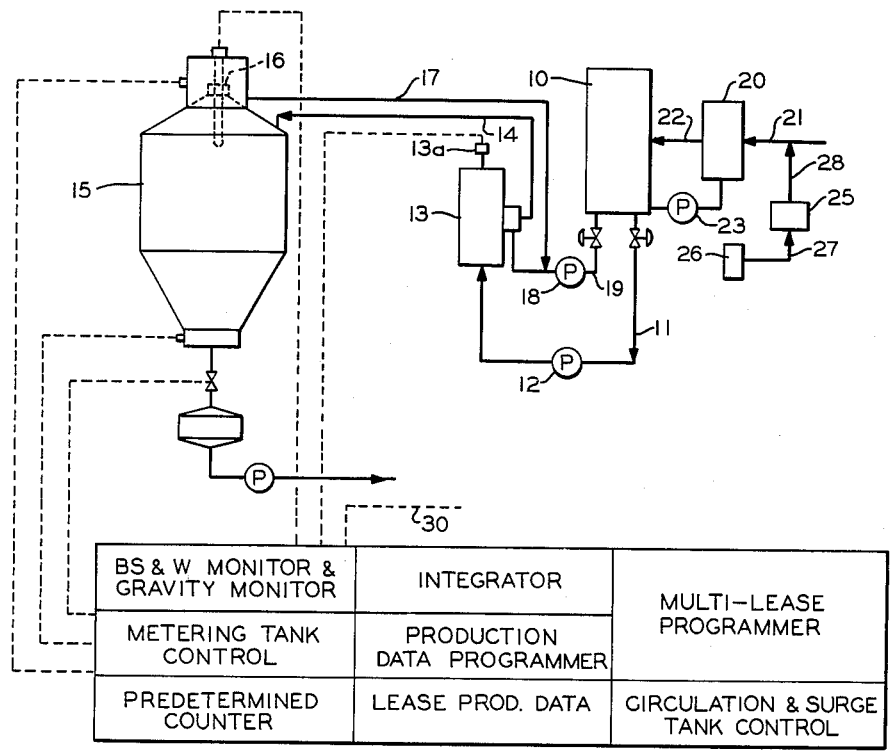

In the system illustrated in FIGURE 1, oil from surge tank 10 flows through transfer line 11 and transfer pump 12, through BS & W detector 13 which includes capacitance element 13a and fill line 14, into meter tank 15. Meter tank 15 is provided with an overflow weir 16 and, below the level of weir 16, overflow line 17. A monitor line 19 from BS & W detector 13 to surge tank 10 is provided with a monitor pump 18 and overflow line 17 connects with line 19 upstream of pump 18. A treater 20 is provided and the lease production from lead line 21 flows through this treater and connecting line 22 into surge tank 10. Provision is made as shown, through circulating pump 23, to recycle oil through treater 20 and back into surge tank 10. A pneumatic chemical injection metering pump 25 is connected with a source of treating chemical 26 by means of feed line 27 and is adapted to supply metered quantities of the treating chemical into lead line 21 through injection line 28.

Figure 2:
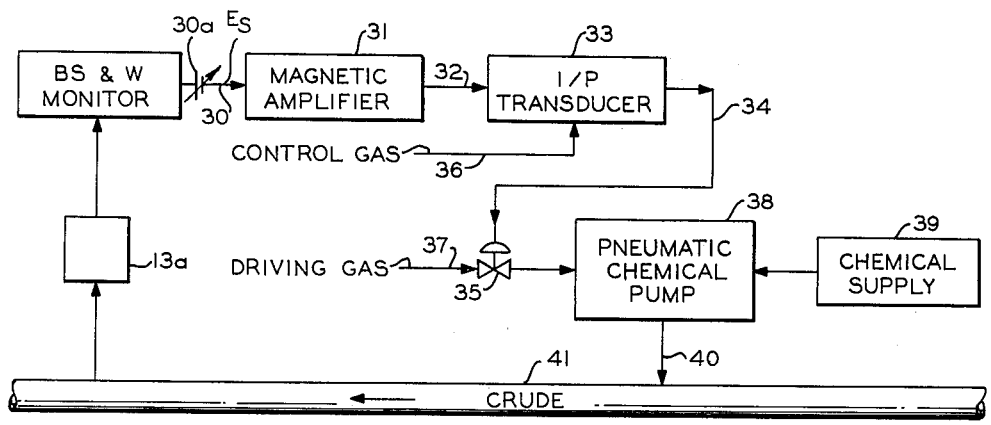
FIGURE 2 is a schematic block diagram of continuous BS & W control means.

In FIGURE 2, the signal which represents the BS & W content flows through line 30, shown in FIGURE 1, from the BS & W monitor to magnetic amplifier 31, and the amplified signal flows through line 32 to transducer 33 where it is converted to a proportional pneumatic pressure which is supplied to control valve 35 through pipe 34. A supply of control gas is fed to transducer 33 through pipe 36 while a supply of driving gas 37 is connected through valve 35 to pneumatic chemical pump 38. The speed of this pump is controlled by the pressure supplied through valve 35 and thus the supply of chemical from the chemical supply 39 which is fed through line 40 into crude line 41 is regulated. A suitable BS & W monitor is the "Dielectric Monitor Model T.D.M." sold by United Engineers, Tulsa, Oklahoma, which utilizes electronic circuits for converting a capacitance BS & W detector signal to a current which is measured and supplied to the circuit.

Figure 3:
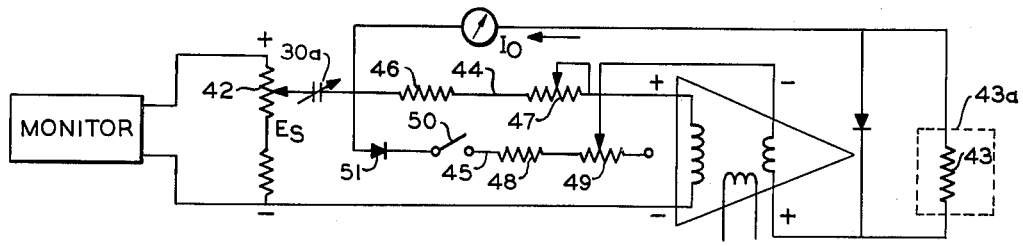
FIGURE 3 is a schematic circuit diagram of a portion of continuous BS & W control means incorporating nonlinear feedback.

FIGURE 3 shows the circuit of magnetic amplifier 31, BS & W monitor and transducer 33 in somewhat more detail, although still schematically. The current signal is transmitted to amplifier 31 as a voltage signal, by means of the resistance 42. The output of amplifier 31 is connected with coil 43 of a current-to-pressure transducer 43a, available commercially. To stabilize the operation of the amplifier the output current is connected as a negative feedback to the input.

A feature of my invention is the parallel circuit in the feedback including a first circuit 44 and a second circuit 45. Circuit 44 includes a resistor 46 and a potentiometer 47 to properly adjust the relationship of the input and output. Circuit 45 includes resistor 48 and potentiometer 49 and in addition a switch 50 and a diode 51. Switch 50 is a manual switch which can be used to make this circuit inoperative if desired. With switch 50 closed this circuit becomes operative when diode 51 begins to transmit current, which occurs at a definite applied voltage. In this circuit the input voltage $E_s$ equals the output current $I_o$ times the feedback resistance $R_f$. Since the resistance in circuit 44 is constant (unless manually adjusted) the relationship between $E_s$ and $I_o$ is a straight line until circuit 45 becomes operative. When this occurs, beyond this point, the relationship between $E_s$ and $I_o$ also is a straight line but having a different slope, since the effective resistance is reduced by the completion of the second portion of the parallel circuit.

Figure 4:
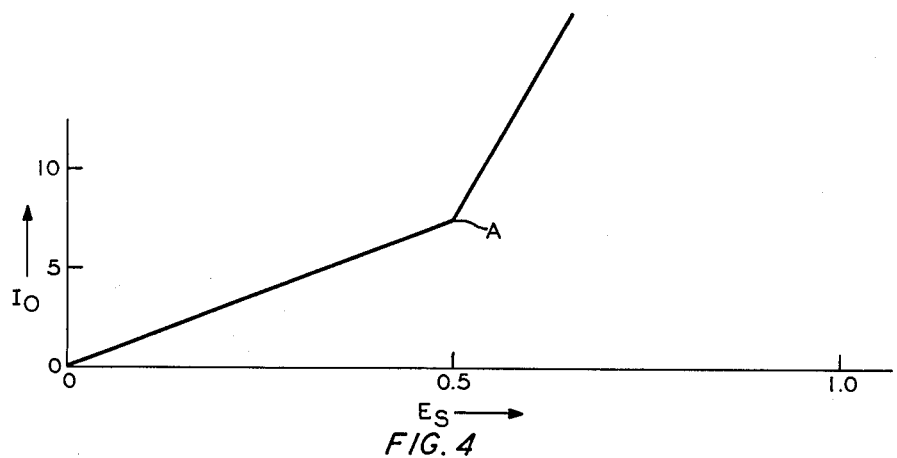
FIGURE 4 is a graph illustrating the variation of output with input utilizing nonlinear feedback.

This is illustrated in FIGURE 4 which shows that, up to point A, the output current increases with increased input on a fairly shallow slope, while at point A, representing the point at which $E_s$ is equal to the minimum operating voltage for diode 51, circuit 45 comes into play. Since the effective resistance is reduced the output current increases more rapidly with an increase in input voltage. In a test made to illustrate this type of operation, the input voltages $E_s$ shown in Table I were fed into the circuit in which a standard 60 c.p.s. magnetic amplifier manufactured by Computers Incorporated and a Minneapolis-Honeywell 0–20 ma. I/P transducer were used, and in which resistors 46 and 48 each were 47 ohms, resistor 47 was a 500 ohm potentiometer and resistor 49 a 100 ohm potentiometer. These potentiometers were adjusted manually. Diode 51 became operative at an input voltage of 0.5. Values for output current with and without circuit 45 as well as the corresponding output of the transducer were recorded.

To change the relationship between the output signal of the BS & W monitor and the input signal to amplifier 31, a zero adjust 30a is provided in line 30. By means of the zero adjust 30a, a small voltage can be added to or subtracted from $E_s$, thus in effect moving the curves of FIGURE 4 or FIGURE 6 up or down without changing their slope. By this means also the BS & W monitor can be by-passed and any desired amount of treating obtained manually but by remote operation by varying the voltage output of zero adjust 30a. In this way the versatility of the installation is increased.

The operation of the circuit illustrated in FIGURE 3 is such that it provides a large reserve of capacity for unexpected increases in BS & W. That is, in the normal operating range, the slope of the curve representing the variation of output current with input voltage is adjusted, by adjusting the resistance in circuit 44, so that the increase in chemical supplied is substantially equal to the amount needed to treat the excess BS & W encountered. However, to prevent production of crude having more than the maximum allowable BS & W content, thus requiring a discontinuance of delivery from that unit, when the BS & W value approaches the allowable value the rate of treatment variation with rate of variation of BS & W is stepped up. That is to say, at some value less than the maximum allowable value, circuit 45 becomes operative thus causing a very large increase in chemical treatment for a relatively small increase in BS & W beyond this point so that, within the capacity of the system the production of crude having more than the allowable BS & W is avoided.

Figure 5:
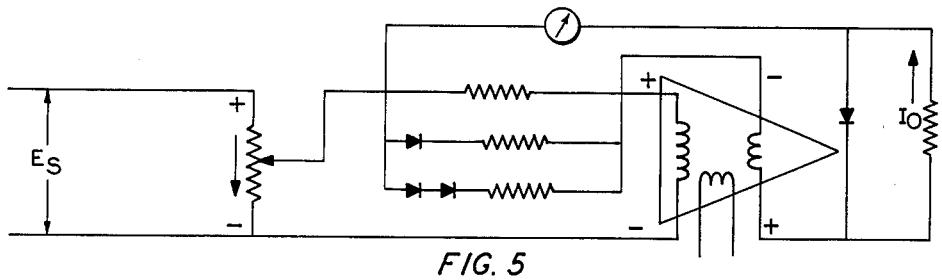
FIGURE 5 is a schematic circuit diagram of continuous BS & W control means comprising a 3-circuit parallel nonlinear feedback system.

FIGURE 5 shows a circuit similar to that of FIGURE 3 but having 2 shunts rather than a single one as illustrated in FIGURE 3. These shunts are designed to cut in at different values of voltage and therefore to provide more than one change in the slope of the response curve. Obviously, more than 3 lines can be used to provide a plurality of slope change points to give the desired response over a wide range of values.

Figure 6:
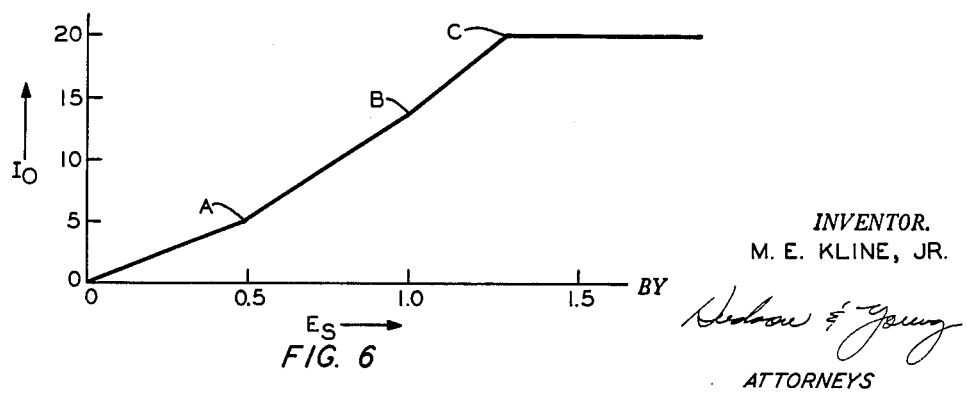
FIGURE 6 is a graph illustrating the variation of output with input with a 3-circuit parallel nonlinear feedback.

The operation of the circuit of FIGURE 5 is illustrated in FIGURE 6. Point A represents the value at which the single diode in a first shunt begins to transmit current while point B represents the value at which the series diodes in a second shunt are actuated to permit the flow of current. Since the effect of adding parallel circuits is to reduce the effective resistance of the feedback circuit, the slope of the current to voltage curve is increased. Point C, on the other hand, represents the value of the output current for which the voltage drop across the current to present transducer equals the voltage necessary to cause a flow of current through the zener diode connected, as illustrated, across the output circuit. This zener diode thus limits the effective output of the amplifier to prevent actuation of the chemical feed means above a predetermined rate.

Although the embodiments illustrated in the drawing show only the addition of parallel circuits, my invention also is applicable to the use of alternate circuits. This is accomplished, for example, by including in circuit 45 the coil of a relay having contacts in circuit 44 so that, when circuit 45 is energized, circuit 44 is deenergized. This type of operation permits reducing the slope of the line as well as increasing it. In this manner, by adding and subtracting circuits the shape of the response curve can be controlled as desired.

Although a magnetic amplifier having the particular nonlinear response circuit illustrated finds particular utility in a crude BS & W treatment unit, it can also be applied to other amplifications requiring a nonlinear response. Although the system has been described in connection with a dump tank type of metering as shown in FIGURE 1, my invention is also applicable to systems using positive displacement metering.

Figure 7:
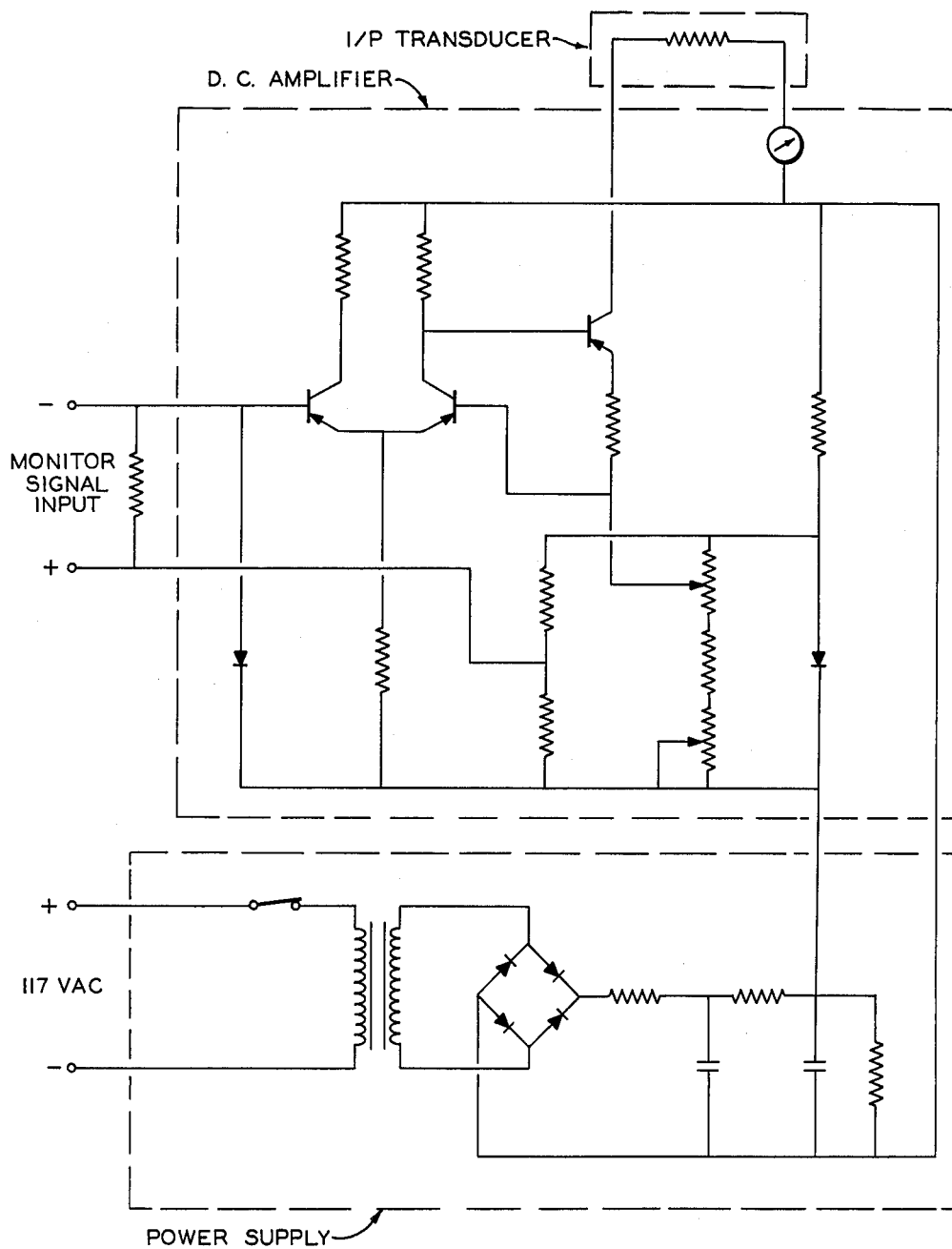
FIGURE 7 is a schematic diagram of a transistorized chemical injector controller.

The circuit illustrated in FIGURE 7 can be applied in the system of FIGURE 2, the D.C. amplifier of FIGURE 7 being inserted in place of magnetic amplifier 31 to provide a continuous control of chemical injection rate.

Figure 8:
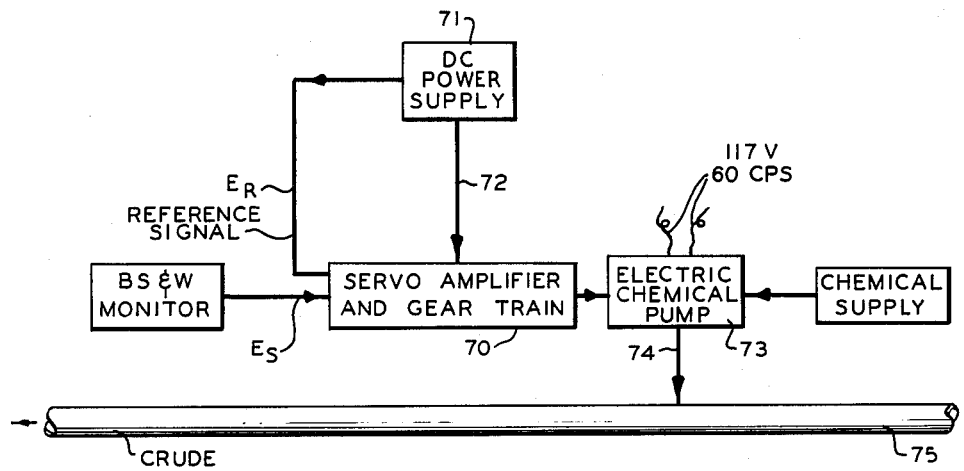
FIGURE 8 is a schematic diagram of a servo operated chemical injector controller.

In the control means illustrated in FIGURE 8 the BS & W monitor output signal $E_s$ is fed to a servo system 70 along with a reference signal $E_r$ from a D.C. power supply 71 which also supplies power to the servo means through power leads 72. The output force of the servo systems 70 is applied to chemical injection means such as electrical chemical pump 73 to vary the rate of injection of treating chemical through line 74 into crude conduit 75. The reference signal $E_r$ is the set point of the control system and when the BS & W signal exceeds the set point signal, a differential signal exists at the servo input and the servo drives the injection rate adjustment to increase the flow of treating chemical into crude conduit 75. Conversely, when the BS & W signal decreases, the servo decreases the chemical injection rate. In this manner the BS & W monitor signal is used to control continuously the rate of injection of a treating chemical respective to a BS & W signal and the system described can be used to maintain the BS & W content of the treated crude at any desired value by adjusting the servo reference signal $E_r$.

A suitable electrical chemical pump for use in this system is the Variable Volume Electrical Drive Injector made by the Texsteam Corporation. This pump has a variable stroke length adjustment which is connected with the servo system. A suitable servo system is the Solid State Servo System manufactured by Solar Electronics Company.

As is well known, BS & W refers to basic sediment and water. A suitable BS & W detector for use in my invention is disclosed in U.S. Patent 3,005,554. Components which can serve as the monitor, integrator, programmer and the various other elements of a complete automatic lease custody transfer system are shown in copending application Serial No. 61,691, filed October 10, 1960, now Patent No. 3,107,526, issued Oct. 22, 1963. Other elements, such as the chemical metering pump, magnetic amplifiers, servo, control valves, transducers, etc. are available commercially.

Table I

| $E_s$ | $I_o$ | P.s.i. | $I_{os}$ | P.s.i. |
|---|---|---|---|---|
| .3 | 4 | 3 | 4 | 3 |
| .4 | 5.5 | 4⅛ | 5.5 | 4⅛ |
| .5 | 6.7 | 5⅛ | 7.3 | 5⅝ |
| .6 | 8.0 | 6 | 9.1 | 6¾ |
| .7 | 9.5 | 7+ | 11.5 | 8⅝ |
| .8 | 10.75 | 8 | 14.3 | 10⅝ |
| .9 | 12.0 | 9¹⁄₁₆ | 17.75 | 12½ |
| 1.0 | 13.5 | 9⅞ | 21 | 13¼ |

Reasonable variation and modification are possible within the scope of the foregoing disclosure, drawings and the appended claims, the essence of which is an improved continuous automatic BS & W control method and apparatus and a novel nonlinear amplifier circuit useful therein.

I claim:
1. BS & W control means comprising BS & W detecting means including means for producing an electrical signal proportional to the BS & W content of a fluid, a magnetic amplifier for said signal, a nonlinear negative feedback circuit for said amplifier of the output to the input thereof, first and second circuits in parallel in said feedback circuit, means in said second circuit for completion thereof at a predetermined signal strength, whereby the electrical output of said amplifier is non-linear with respect to said BS & W content, a transducer for converting said electrical output of said amplifier to a pneumatic pressure, fluid pressure actuated chemical injection means for injecting chemical into said fluid, means connecting said transducer with said injection means to control the rate of operation thereof continuously responsive to said pneumatic pressure.

2. BS & W control means comprising BS & W detecting means including means for producing an electrical signal proportional to the BS & W content of a fluid, a magnetic amplifier for said signal, nonlinear negative feedback for said amplifier of the output to the input thereof whereby the electrical output of said amplifier is nonlinear with respect to said BS & W content, a transducer for converting said electrical output of said amplifier to a pneumatic pressure, fluid pressure actuated chemical injection means for injecting treating chemical into said fluid, means connecting said transducer with said injection means to control the rate of operation thereof continuously responsive to said pneumatic pressure.

References Cited by the Examiner
UNITED STATES PATENTS

| | | | |
|---|---|---|---|
| 2,657,700 | 10/1953 | Ray | 210—96 X |
| 2,819,726 | 1/1958 | Rendel | 137—93 |
| 2,940,593 | 6/1960 | Remke et al. | 210—96 |
| 3,055,554 | 10/1961 | Kuntz | 210—96 |
| 3,036,224 | 5/1962 | Abraham | 330—110 X |
| 3,067,133 | 12/1962 | Conley et al. | 210—96 X |
| 3,074,277 | 1/1963 | Hill | 137—93 |
| 3,085,208 | 4/1963 | Darling | 330—8 |
| 3,094,675 | 6/1963 | Ule | 330—110 |

ISADOR WEIL, *Primary Examiner.*

JULIUS GREENWALD, WILLIAM F. O'DEA,
*Examiners.*

H. GUYNN, J. O'NEILL, *Assistant Examiners.*